May 7, 1963 C. B. SMITH 3,089,128

MAGNETIC CORE SWITCHING CIRCUIT

Filed March 23, 1961

INVENTOR.
CHARLES B. SMITH

BY

[signature]

AGENT 3,089,128

MAGNETIC CORE SWITCHING CIRCUIT

Charles B. Smith, Vestal, N.Y., assignor to International Business Machines Corporation, New York, N.Y., a corporation of New York Filed Mar. 23, 1961, Ser. No. 98,283
2 Claims. (Cl. 340—174)

This invention relates to bistable magnetic core devices.

This application is a continuation-in-part of my application Serial No. 685,970, filed September 24, 1957, now abandoned.

In the preferred embodiment, the invention is utilized in an arrangement for detecting the absence of data and/or the presence of more data than is intended in specific areas, or columns or regions of a data bearing medium. Moreover, the invention may be utilized in applications for the detection of signals in excess of a certain required number issued from a source presumably adapted to issue a valid number for each operation of the source.

Although the invention is illustrated in connection with a particular machine of the type controlled by punched records, it may be appreciated that the invention may also be utilized in a variety of types of data processing machines adapted to process record media in which the data is manifested in forms other than punched holes, for example, conductive marks, magnetized areas or spots, photosensitive marks, etc.

The main object resides in the utilization of a non-ring series circuit arrangement for setting and resetting a core in response to a single pulse of current.

Another object resides in the use of the circuit arrangement employing the magnetic core and its novel non-ring circuit for the analysis or the detection of the presence of or absence of the data content of a record bearing medium, which arrangement is faster in operation and more economical to manufacture than appropriate arrangements of the prior art.

The foregoing and other objects, features and advantages of the invention will be apparent from the following more particular description of preferred embodiments of the invention, as illustrated in the accompanying drawings.

Figure 2:
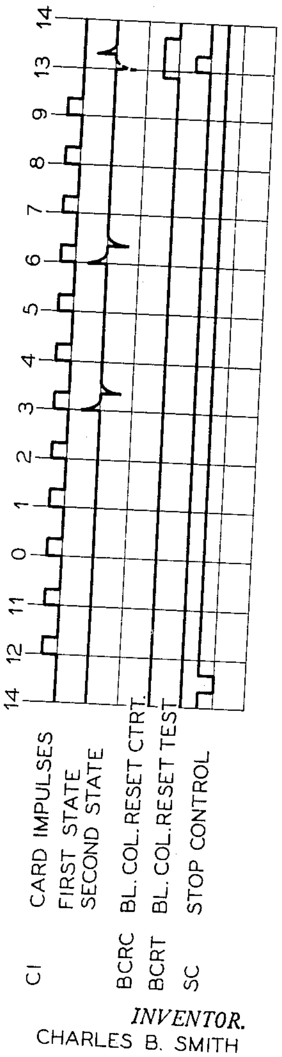
FIG. 2 is a time chart showing appropriate machine control signals in relation to the machine cycle, and curves associated with the operation of the core.

The invention is incorporated in a machine of the type shown and described in the Patent 2,053,067 issued to J. M. Cunningham on September 1, 1936. This machine is commonly referred to as a reproducing punch and is adapted with two record feeding units, namely, a read unit and a punch unit. Perforated records 1 are normally placed in the reading unit while blank cards are generally placed in the punch unit. In the normal course of operation of the reproducing punch, the data read from the records passing through the read unit are punched into the blank records passing through the punch unit. For the purpose of illustrating an application of the invention, the punch unit will be considered but only in a somewhat schematic manner. The records 1 passing therethrough are fed twelve edge, *1a*, first, so that the index point data representing positions on the records will correspond to the cycle point timing of the machine. The basic timing cycle of the machine is shown in the timing chart of FIG. 2 of the drawings. At the top of this timing chart it will be seen that the machine cycle is comprised of fourteen points, beginning with point 14, followed by the card index point positions 12–11–0–1 through 9, and point 13.

Figure 1:
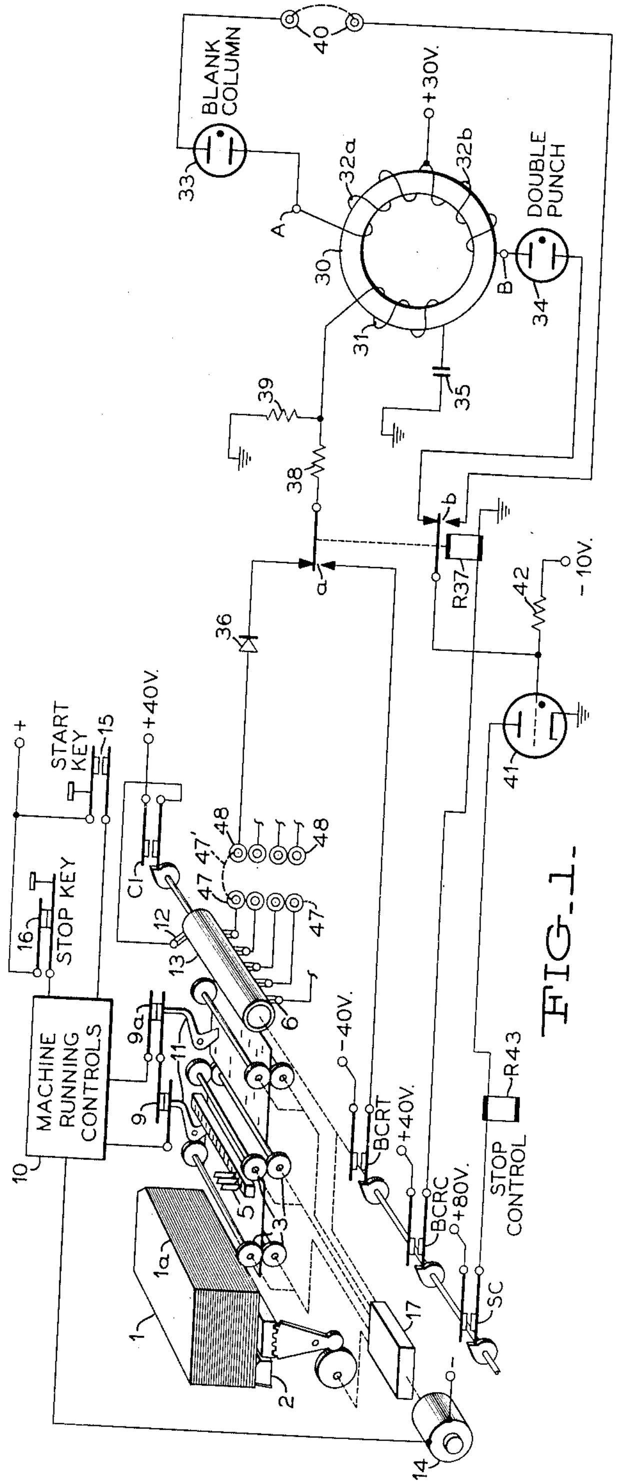
FIG. 1 shows a circuit arrangement utilizing the invention in connection with a well-known type of card controlled machine shown in schematic form.

Referring to the left side of FIG. 1, there is shown diagrammatically the punch unit which has a stack of records 1 supported in a hopper, not shown. A conventional picker knife arrangement 2 is used to feed the records singly to appropriate sets of feed rolls 3 disposed along the path of card travel in the machine. These feed rolls convey the records in succession through a punching station, a reading or checking station and finally into a card receiving stacker, not shown. The punching station is diagrammatically shown as having a single row of punches 5 cooperating with a die, not shown, disposed beneath the path of travel of the cards. The punches are driven by means, not shown, to perforate the records in accordance with data fed into a punch control setup means, not shown. In the normal course of operation of the machine, this data is usually sensed from the perforated records passing through the read unit of the reproducing machine.

The reading or checking station comprises a line of 80 sensing brushes 6 of which only a few are shown. These brushes terminate in plug sockets 47 to which plug wires 47′ are connected, the opposite ends of which are connected to plug sockets 48 forming inputs to the circuit means incorporating the invention.

As further seen in FIG. 1, the punch unit is provided with Machine Running Controls 10, in block form, connected to card lever contacts 9 and **9*a* operated upon by the well-known card levers 11 in turn disposed to cooperate with the records passing through the machine. These Machine Running Control circuits include circuits of a preparatory nature which control the machine run-in and runout operations. At appropriate times in each machine cycle, a common brush 12 cooperating with the contact roll 13 energizes the latter so as to enable timed impulses to be provided at the sensing brush sockets 47 in response to the sensing of perforations encountered by the sensing brushes 6**.

The machine is driven by a drive motor 14 whose control circuits are influenced by the Machine Running Control circuits. Appropriate start and stop keys 15 and 16 are provided to initiate and stop operations of the machine. The necessary clutch means, controls therefor and cam contacts are housed in a box referenced as 17.

Machine cam contacts employed for the operation of the preferred embodiment, comprise a cam contact for issuing card impulses, CI; one for blank column and reset control, BCRC; one for blank column and reset test, BCRT; and one for stop control, SC.

The invention includes a bistable device having two conditions, or states, of equilibrium, an example of such device being a magnetic core 30 shown in the drawings. The core has a winding 31 and a center tapped winding consisting of portions **32*a* and 32*b*, with the center tap being supplied by a source of +30 volts. The winding 32*a* is further connected to a circuit including a blank column indicating means 33 in the nature of a gas-filled diode, the winding 32*b*, connected to a circuit which includes a similar diode 34. The winding 31 is connected in series with a capacitor 35 in turn connected to ground. An input circuit is adapted to energize the winding 31 during a sensing of data designations and during a reset and blank column detection operation. In the sensing of the data designation, the circuit path extends from a socket 48 through diode 36**, relay contacts R37*a* normally closed contacts, through resistor 38 of 390 ohms, through the winding 31, capactor 35 and ground. During a reset and blank column detecting operation, the circuit path for energizing winding 31 extends from a −40 volt supply through cam contacts BCRT, through the transferred contact points of R37*b*, through the resistor 18, winding 31, capacitor 35 and ground.

During the operation mentioned, the winding 31 is energized to change the condition of the core from one state to another during the rise time of the signal representing the sensed data. Concurrently, the capacitor 35 charges and continues to charge until the termination of the data signal. During the fall time of the signal, the capacitor 35 discharges through the winding 31 to effect a change in the core's condition of equilibrium; that is, the core is restored to its original state.

The discharge path for the capacitor follows a path from the capacitor, through the winding 31, resistor 39 of 390 ohms to ground.

In the operation described, the series non-ringing circuits for charging and discharging the capacitor, in response to a single pulse, depend upon the proper relation of resistance to capacitance and inductance according to the expression $$R \geqq 2\sqrt{\frac{L}{C}}$$

where R, L and C respectively stand for resistance, inductance and capacitance. In the specific instance, where $$R = 2\sqrt{\frac{L}{C}}$$

a critical damping condition is said to exist and, under such instance, transients or high ringing oscillations will not exist and maximum unidirectional current will flow. When R is greater than $$2\sqrt{\frac{L}{C}}$$

a condition of overdamping is said to exist, but here the current flow is not as great.

Thus, only under the critical or overdamped condition will the series circuits operate according to the invention. In the series LCR circuits for charging and discharging the capacitor, it has been determined that, at the critical condition, the capacitor charging rate is most rapid.

The operation of contacts R37*a* and R37*b* is controlled by parent relay R37 contained in a circuit controlled by cam contacts BCRC. The contacts **37*b* enable the firing of a thyratron 41 in the event of a double punch condition, i.e., the detection of an unwanted designation or signal, or upon the detection of a blank column. The blank column indicating circuit further includes pluggable means 40** which enables the blank column detecting circuit to be selectively used.

Upon the firing of the thyratron 41, a stop control relay 43 is energized under control of the stop cam contacts SC.

Figure 3:
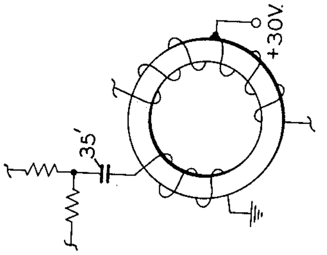
FIG. 3 is a partial detail circuit drawing showing another arrangement for connecting the capacitor to the core winding.

FIG. 3 shows another arrangement in which the capacitor 35' is connected in series with the winding 31 of the core.

The circuit operation for the detection of an unwanted designation, or for that matter an unwanted signal, will now be described.

Assume for the moment that the core 30 is set to a first state of equilibrium and that the record passing through the machine contains an unwanted designation in addition to the valid designation contained in the column being sensed. Upon detection or the sensing of the first data designation, a signal is transmitted through the diode 36, the relay contacts **37*a* normally closed, resistor 38, winding 31, capacitor 35 to ground. The transmitted signal, representing the data designation sensed, accordingly energizes the winding 31 and charges the capacitor 35. Energization of the winding 31 as just mentioned does not actually switch the core at this time but merely drives the core to a greater degree of saturation so that, in effect, no change in state occurs at this point. Upon termination of the transmitted signal, the capacitor discharges, through the discharge path previously described, to send a current in reverse direction through the winding 31**, thereby energizing the latter to switch the core to its second state of equilibrium. The switching currents for switching the core to its first and second states are shown in appropriate places on the sequence chart of FIG. 2. At the end of the signal in question, it will be noted that the core is set to its second state of equilibrium.

In switching the core from a first state to a second state, the voltage developed at point A is above the firing potential of diode 33, whereas the voltage developed at point B is below the firing of potential of diode 34. Diode 33 does not fire at this time in view of the open condition of relay point **37*b***.

Upon the detection of the unwanted designation or signal, the same non-ringing circuit will be involved to apply the signal to energize the winding 31 and to charge the capacitor 35 in the manner explained. This time, however, the core is switched from a second state to a first state, in which operation the voltage developed at point B is above firing potential while at point A it is below firing potential. Consequently, diode 34 ionizes and passes a signal through the contact **37*b* through grid resistor 42 and to a −10 volt source. This automatically raises the potential on the grid of the thyratron 41, causing the latter to fire and so energize the stop relay R43, which provides for stopping of the machine by well-known means, not shown. The energization of the diode 34 is thus an indication of the detection of an unwanted signal or an unwanted designation. Upon termination of the unwanted signal, the capacitor discharges to energize the winding 31**, this time causing the core to switch to its second state. Any further unwanted signals applied to the winding of the core during the remaining portion of the sensing cycle causes the core to switch to its first state and then back to the second state in the manner described.

At the end of the card reading or sensing time of the machine cycle but before the termination of the machine cycle, cam contact BCRT and BCRC make the latter effecting energization of the relay 37 causing the latter to transfer its contact points **37*a* and 37*b*. Through the transferred points of relay 37*a*, a −40 volt signal is supplied by way of cam contact BCRT to energize winding 31 and charge the capacitor 35. The direction of current flow at this time through winding 31** merely drives the core further into saturation and with no change in state. Upon termination of the −40 volt signal, the winding is energized upon the discharge of the capacitor, this time switching the core from its second state to a first state. Thus, the core at the end of the machine cycle is set in its first state and remains in this state in preparation for the next sensing operation.

For a blank column detecting operation, the core remains in its first state throughout the sensing portion of the machine cycle. At test time of the machine cycle, i.e., when the BCRC cam contact and BCRT cam contact make, winding 31 is energized by means of a −40 volt signal to switch the core from a first state to a second state and at the same time charge capacitor 35. During this switching time, point B is driven below firing potential while point A is raised above firing potential. Consequently, diode 33 ionizes to pass a signal through the plug socket connections 40 through contact **37*b* now transferred to raise the potential on the grid of thyratron 41. The latter fires and eventuates activities which stop the machine as described. The firing of diode 33 is thus an indication of a blank column. Upon termination of the signal, the winding 31 is energized by the discharge current of the capacitor 35** to switch the core to its first state, in which state it will remain, in preparation for the next detecting operation.

In the preferred embodiment of FIG. 1, the following values and operating characteristics have been found to give fast switching response and reliable operation. Using a capacitor, 35, of .2 microfarad; resistors, 38 and 39, each of 390 ohms; winding 31 of 400 turns with an inductance of 8 millihenries; windings 32a and 32b, each of 1200 turns; and applying respectively input voltages of 40 volts, 50 volts and 60 volts, the outputs from winding 32a are as follows: 50 volts minimum for the first 100 microseconds of an output pulse of 700 microseconds' duration; 65 volts minimum for the first 100 microseconds of an output pulse of 425 microseconds' duration and 75 volts minimum for the first 100 microseconds of an output pulse of 400 microseconds' duration, respectively.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for detecting signals in excess of a required number of signals issued from a periodically operable source which presumably issues a required number of signals for each periodic operation thereof but which may issue signals in excess of the required number comprising a bistable magnetic core having first and second conditions of stability; a first winding on said core adapted to set the latter to either condition of stability depending upon the direction of current flow therethrough; a capacitor connected in series with said first winding; a critically damped detecting circuit including the serially connected capacitor and first winding; a critically damped discharge circuit including said first winding and capacitor; reset means for applying to said detecting circuit a reset pulse of current to reset said core to a first condition of stability in preparation for the detecting operation; means operable thereafter for applying said signals to said detecting circuit during the detecting operation, the first signal of said signals causing said capacitor to charge and, during the fall time of said first signal, said capacitor discharging through said discharge circuit to energize said first winding to cause said core to change from its first condition of stability to its second condition of stability, and, for each subsequent signal of said signals issued thereafter to said detecting circuit, said core changing from a second condition of stability to a first condition of stability respectively during the rise and fall times of said each subsequent signal; a second winding on said core for issuing a particular voltage in response to a change from a second condition of stability to a first condition of stability; and indicating means connected to said second winding and responsive to said particular voltage for providing an indication of the excess signals.

2. A device for detecting signals in excess of a required number of signals issued from a periodically operable source which presumably issues a required number of signals for each periodic operation thereof but which may issue signals in excess of the required number comprising a bistable magnetic core having first and second conditions of stability; a first winding, with an inductance value of L, on said core adapted to set the latter to either condition of stability depending upon the direction of current flow therethrough; a capacitor, with a capacitance value of C, connected in series with said first winding; a critically damped detecting circuit including the serially connected capacitor and first winding and having a total circuit resistance $$\geq 2\sqrt{\frac{L}{C}}$$

a critically damped discharge circuit including said first winding and capacitor and having a resistance equivalent to said total circuit resistance; reset means for applying to said detecting circuit a reset pulse of current to reset said core to a first condition of stability in preparation for the detecting operation; means operable thereafter for applying said signals to said detecting circuit during the detecting operation, the first signal of said signals cousing said capacitor to charge, and, during the fall time of said first signal, said capacitor discharging through said discharge circuit to energize said first winding to cause said core to change from its first condition of stability to its second condition of stability and, for each subsequent signal of said signals issued thereafter to said detecting circuit, said core changing from a second condition of stability to a first condition of stability respectively during the rise and fall times of said each subsequent signal; a second winding on said core for issuing a particular voltage in response to a change from a second condition of stability to a first condition of stability; and indicating means connected to said second winding and responsive to said particular voltage for providing an indication of the excess signals.

References Cited in the file of this patent

UNITED STATES PATENTS

| | | |
|---|---|---|
| 2,930,029 | Moore | Mar. 2, 1960 |
| 2,939,124 | Saxenmeyer | May 31, 1960 |
| 2,941,089 | Brown | June 14, 1960 |
| 2,970,293 | Eckert | Jan. 31, 1961 |
| 2,992,393 | Gray et al. | July 11, 1961 |